(12) United States Patent
Ito (10) Patent No.: US 8,576,295 B2
(45) Date of Patent: Nov. 5, 2013

(54) IMAGE PROCESSING APPARATUS AND IMAGE PROCESSING METHOD

(75) Inventor: Yasuhiro Ito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 253 days.

(21) Appl. No.: 12/788,854

(22) Filed: May 27, 2010

(65) Prior Publication Data

US 2010/0321539 A1    Dec. 23, 2010

(30) Foreign Application Priority Data

Jun. 22, 2009  (JP) ................................. 2009-147950

(51) Int. Cl.
*H04N 5/228* (2006.01)

(52) U.S. Cl.
USPC ........ 348/222.1; 348/362; 382/284; 382/294; 382/295; 396/222

(58) Field of Classification Search
USPC ............... 348/222.1, 241, 362; 382/274, 284, 382/294, 295; 396/222
See application file for complete search history.

(56) References Cited

U.S. PATENT DOCUMENTS

| 7,075,569 | B2 | 7/2006 | Niikawa |
| 7,142,723 | B2 | 11/2006 | Kang et al. |
| 2002/0135688 | A1 | 9/2002 | Niikawa |
| 2005/0013471 | A1* | 1/2005 | Snoeren et al. ............... 382/131 |
| 2005/0013501 | A1 | 1/2005 | Kang et al. |
| 2005/0243176 | A1* | 11/2005 | Wu et al. .................... 348/207.1 |
| 2010/0157078 | A1* | 6/2010 | Atanassov et al. ......... 348/222.1 |

FOREIGN PATENT DOCUMENTS

| JP | 2002-290829 | 10/2002 |
| JP | 2005-045804 | 2/2005 |

OTHER PUBLICATIONS

E. Castro et al., "Registration of Translated and Rotated Images Using Finite Fourier Transforms," IEEE Transactions on Pattern Analysis and Machine Intelligence, vol. PAM1-9, No. 5, Sep. 1987.

* cited by examiner

*Primary Examiner* — Sinh Tran
*Assistant Examiner* — Paul Berardesca
(74) *Attorney, Agent, or Firm* — Fitzpatrick, Cella, Harper & Scinto (57) ABSTRACT

A plurality of images captured in different exposure times are aligned in order of exposure time, and pairs each of two images adjacent on the line are set. Common regions in long- and short-time images contained in a pair of interest are specified based on the pixel value distributions of the respective images. A location error correction amount for the long-time image is calculated to make the common regions match each other when the long- and short-time images are composited with each other. The long-time image undergoes image processing based on the location error correction amount. A composite image is generated by compositing a plurality of images obtained by performing image processing for each pair. The generated composite image is output.

7 Claims, 9 Drawing Sheets

CALCULATION OF ERROR AMOUNT OF CENTER OF BLOCK

IMAGE PROCESSING APPARATUS AND IMAGE PROCESSING METHOD

BACKGROUND OF THE INVENTION

1. Field of the Invention

The present invention relates to a technique for generating an image having a wide dynamic range using a plurality of images.

2. Description of the Related Art

When the user captures an image with a digital camera outdoors, the luminance range of the captured scene is sometimes wider than a capturable luminance range. In this case, tone information of an object outside the capturable luminance range cannot be recorded, so a highlight-detail loss or shadow-detail loss occurs. For example, when a person is captured outdoors on a fine day while the exposure is adjusted to him, a highlight-detail loss may occur in the background including the sky and clouds, or a shadow-detail loss may occur in the shade of trees. On the other hand, the human vision has a characteristic called "local adaptation" that switches the adaptation state according to the brightness and color of a region one views. With this characteristic, one can perceive tones in both bright and dark places. For this reason, an impression upon viewing a captured image sometimes differs from that upon directly viewing a scene. Digital camera users complain about it.

One technique for solving this problem is a high dynamic range imaging technique (HDR technique). The HDR technique roughly includes an HDR capture technique and HDR reproduction technique.

The HDR capture technique is used to widen the capturable dynamic range and record tone information of a luminance range suffering a highlight- or shadow-detail loss. In an example of this technique, images captured at a plurality of exposure values are composited. An image acquired by the HDR capture technique will be called an HDR image.

The HDR reproduction technique is an image processing technique for preferably reproducing an HDR image having a wide dynamic range by a display/output device having a narrow dynamic range. In an example of this technique, the low-frequency components of an HDR image are compressed. The HDR technique can reduce highlight- and shadow-detail losses by the capture technique for widening the dynamic range and a reproduction technique corresponding to a captured image having a wide dynamic range.

In the HDR image compositing technique, when compositing images captured at different exposure values, the compositing locations of the target images need to be calculated accurately. However, the HDR image is obtained by compositing images captured at different times, so the images to be composited are not identical in all pixels. However, images captured within a short time have a high degree of correlation and can be composited after slightly correcting the compositing locations.

A mark for correcting the location is necessary in compositing location correction for compositing images captured within a short time. In other words, respective images need to have a region where the same object is captured. In general, identical regions are extracted from respective images captured at different exposure values by executing brightness correction for the images (Japanese Patent Application No. 2005-045804).

However, when compositing images having greatly different exposure times, it is difficult to extract identical regions by only performing exposure compensation owing to a shadow-detail loss in an image having a short exposure time and a highlight-detail loss in an image having a long exposure time. Hence, an image suffering many highlight-detail losses and one suffering many shadow-detail losses cannot be simultaneously aligned by only brightness correction.

SUMMARY OF THE INVENTION

The present invention has been made to solve the above problems, and provides a technique for compositing images captured at different exposure values after more accurately aligning them.

According to the first aspect of the present invention, there is provided an image processing apparatus comprising: a unit which acquires a plurality of images captured in different exposure times; a setting unit which, when the plurality of images are aligned in order of exposure time, sets pairs each of two images adjacent on a line; a specification unit which, when an image having a longer exposure time out of two images contained in a pair of interest is defined as a long-time image and an image having a shorter exposure time is defined as a short-time image, specifies common regions in the long-time image and the short-time image, based on pixel value distributions of the long-time image and short-time image; a calculation unit which calculates a location error correction amount of the long-time image to make the common region in the long-time image match the common region in the short-time image when the long-time image and the short-time image are overlapped with each other; a processing unit which performs image processing for the long-time image based on the location error correction amount; and a unit which generates a composite image by compositing the plurality of images obtained by processing each pair by the processing unit, and outputs the generated composite image.

According to the second aspect of the present invention, an image processing method comprising: a step of acquiring a plurality of images captured in different exposure times; a setting step of, when the plurality of images are aligned in order of exposure time, setting pairs each of two images adjacent on a line; a specification step of, when an image having a longer exposure time out of two images contained in a pair of interest is defined as a long-time image and an image having a shorter exposure time is defined as a short-time image, specifying common regions in the long-time image and the short-time image, based on pixel value distributions of the long-time image and short-time image; a calculation step of calculating a location error correction amount between the long-time image and the short-time image to make the common region in the long-time image match the common region in the short-time image when the long-time image and the short-time image are overlapped with each other; a processing step of performing image processing for the long-time image, based on the location error correction amount; and a step of generating a composite image by compositing the plurality of images obtained by processing each pair in the processing step, thereby outputting the generated composite image.

Further features of the present invention will become apparent from the following description of exemplary embodiments with reference to the attached drawings.

DESCRIPTION OF THE EMBODIMENTS

Embodiments of the present invention will now be described with reference to the accompanying drawings. The following embodiments are merely examples for practicing the present invention.

First Embodiment

<Arrangement of Image Processing Apparatus According to First Embodiment>

Figure 1:
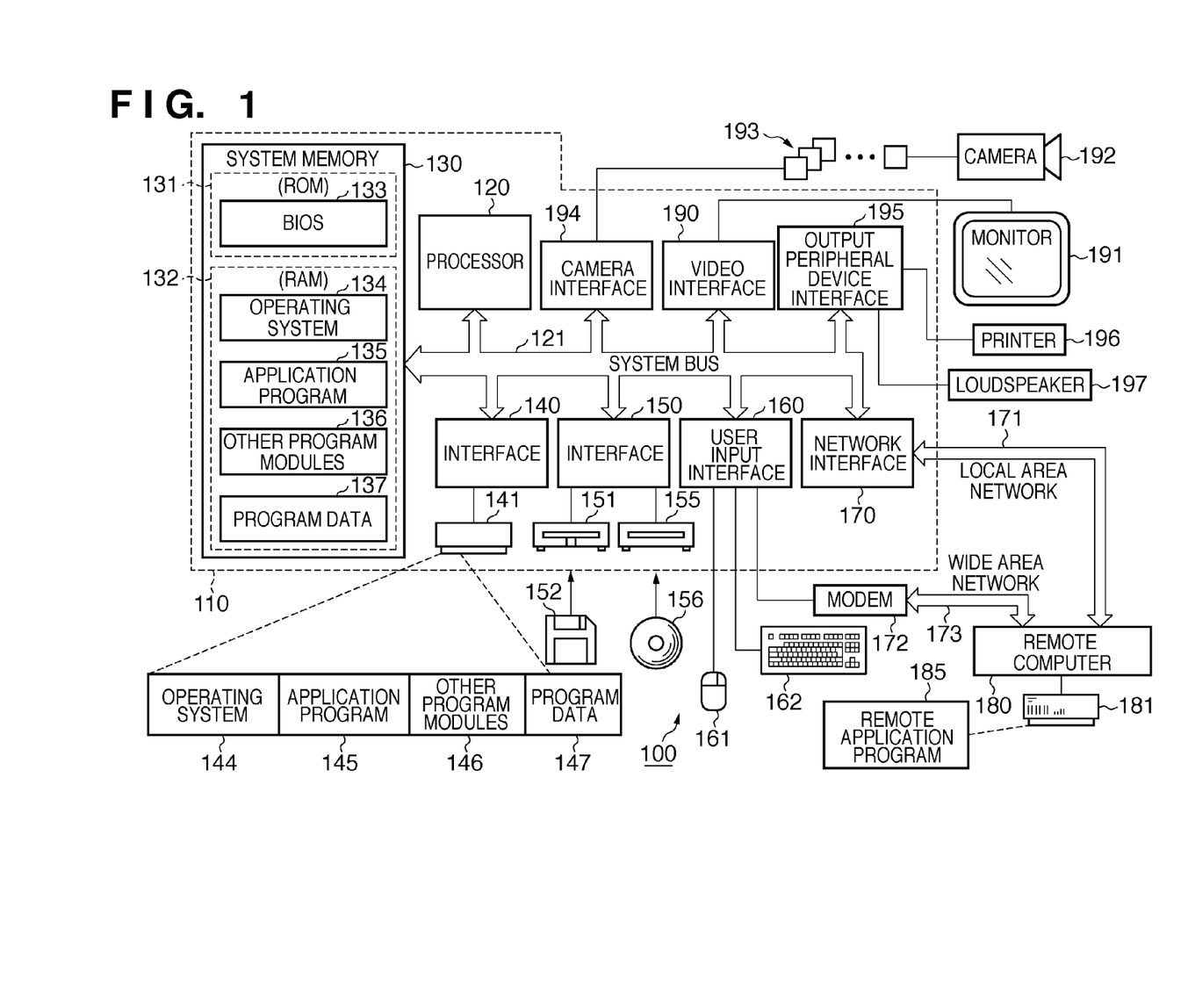
FIG. 1 is a block diagram showing the arrangement of a computer 110 and its peripheral devices.

The arrangement of an image processing apparatus and its peripheral devices according to the first embodiment will be described. FIG. 1 is a block diagram showing the arrangement of a computer 110 serving as the image processing apparatus and its peripheral devices according to the first embodiment. A computing system environment 100 according to the embodiment includes the computer 110 and its peripheral devices.

The computing system environment 100 shown in FIG. 1 is merely an example of a computing environment suitable for the embodiment, and does not limit the range of use or functions. It should not be interpreted that the computing system environment 100 depends on or requires an arbitrary one or a combination of building elements in the computing system environment 100 which is an illustrative operation environment.

The embodiment can be implemented in many other general- or special-purpose computing system environments or arrangements. Examples of a known computing system, environment, and/or arrangement which is likely to be suitable for use in the embodiment are not limited to those described here. For example, a distributed computing environment containing some of the following devices is also available.

personal computer
server computer
hand-held or laptop device
multiprocessor system
system using a microprocessor
set-top box
programmable home electrical appliance
network PC (Personal Computer)
minicomputer or main frame computer
system or device mentioned above The embodiment can be described substantially along computer executable instructions such as program modules executed by a computer. The program modules generally include routines, programs, objects, components, data structures, and the like which perform specific tasks or contain specific abstract data. The embodiment can also be practiced in a distributed computing environment where remote processing devices linked via a communication network execute tasks. In the distributed computing environment, program modules can reside in both local and remote computer storage media including a memory device.

As shown in FIG. 1, the computer 110 (general-purpose computing device) is used as the image processing apparatus according to the embodiment. The computer 110 includes a processor 120, a system memory 130, and a system bus 121 which connects various system building elements including the system memory 130 to the processor 120, though the building elements of the computer 110 are not limited to them. The system bus 121 may adopt any of several types of bus structures including a memory bus or memory controller, a peripheral bus, and a local bus each using an arbitrary one of various bus architectures.

In general, the computer 110 includes a variety of computer readable media. The computer readable media suffice to be arbitrary available media to which the computer 110 can access, and include volatile and nonvolatile media, and removable and nonremovable media. For example, the computer readable media can include computer storage media and communication media, though the computer readable media are not limited to them. The computer storage media include volatile and nonvolatile media, and removable and nonremovable media which are implemented by an arbitrary method or technique for storing information such as computer readable instructions, data structures, program modules, and other data.

The system memory 130 includes computer storage media in the form of a volatile and/or nonvolatile memory, such as a read only memory (ROM) 131 and random access memory (RAM) 132. The ROM 131 generally stores a BIOS (Basic Input/Output System) 133 which helps transfer information between elements in the computer 110 upon start-up or the like. The RAM 132 generally holds data and/or program modules which can be immediately accessed by the processor 120 and/or are now in use by the processor 120. For example, the RAM 132 holds an operating system 134, application program 135, other program modules 136, and program data 137 in FIG. 1, though the data and program modules held in the RAM 132 are not limited to them.

The computer 110 can also include other removable/nonremovable and volatile/nonvolatile computer storage media. For example, FIG. 1 shows a hard disk drive 141 which performs read/write from/in a nonremovable nonvolatile magnetic medium, and a magnetic disk drive 151 which performs read/write from/in a removable nonvolatile magnetic disk 152. FIG. 1 also shows an optical disk drive 155 that performs read/write from/in a removable nonvolatile optical disk 156 such as a CD-ROM or another optical medium.

Other removable/nonremovable and volatile/nonvolatile computer storage media usable in this illustrative operation environment are not limited to them. In general, the hard disk drive 141 is connected to the system bus 121 via a nonremovable memory interface such as an interface 140. The magnetic disk drive 151 and optical disk drive 155 are generally connected to the system bus 121 via a removable memory interface such as an interface 150.

The above-described drives shown in FIG. 1 and computer storage media associated with them store computer readable instructions, data structures, program modules, and other data for the computer 110. For example, in FIG. 1, the hard disk drive 141 stores an operating system 144, application program 145, other program modules 146, and program data 147. Note that these components may be identical to or different from the operating system 134, application program 135, other program modules 136, and program data 137. In this example, the operating system 144, application program 145, other program modules 146, and program data 147 are denoted by reference numerals different from those of the operating system 134, application program 135, other program modules 136, and program data 137 to represent that they are at least copies different from the operating system 134, application program 135, other program modules 136, and program data 137.

The user can input commands and information to the computer 110 via input devices such as a keyboard 162 and a pointing device 161 generally called a mouse, track ball, or touch pad. Other input devices (not shown) are, for example, a microphone, joy stick, game pad, satellite dish, and scanner. These input devices are often connected to the processor 120 via a user input interface 160 coupled to the system bus 121. However, these input devices can also be connected via another interface and bus structure such as a parallel port, game port, or universal serial bus (USB).

A monitor 191 or another type of display device is connected to the system bus 121 via an interface such as a video interface 190. The computer 110 allows connecting other peripheral output devices such as a loudspeaker 197 and printer 196 in addition to the monitor 191. These peripheral output devices can be connected to the system bus 121 via an output peripheral device interface 195.

Input devices for the computer 110 can also include a camera 192 (digital/electronic still camera, video camera, or film/photo scanner) capable of capturing a series of images 193, which is especially important in the following description. FIG. 1 shows only one camera, but a plurality of cameras can be included as input devices for the computer 110. The images 193 from one or a plurality of cameras are input to the computer 110 via an appropriate camera interface 194. The camera interface 194 is connected to the system bus 121. A series of captured images 193 are transferred to the RAM 132 or one of other data storage devices associated with the computer 110 and can be stored as data. Note that the image data can be input from the above-mentioned computer readable medium to the computer 110 without using the camera 192.

The computer 110 can operate in a network environment using logical connections with one or a plurality of remote computers such as a remote computer 180. The remote computer 180 may be a personal computer, server, router, network PC, peer device, or another general network node. In FIG. 1, only a memory device 181 is connected to the remote computer 180. However, memory devices generally include most or all elements mentioned in association with the computer 110.

Logical connections shown in FIG. 1 include a local area network (LAN) 171 and wide area network (WAN) 173, but can also include other networks. When the computer 110 is used in the LAN networking environment, it is connected to the LAN 171 via a network interface 170 (or adaptor). When the computer 110 is used in the WAN networking environment, it generally includes a modem 172 or another unit for establishing communication via the WAN 173 such as the Internet. The modem 172 may be a built-in or external modem, and is connectable to the system bus 121 via the user input interface 160 or another proper mechanism. In the network environment, all or some program modules shown in association with the computer 110 can be stored in the memory device 181. For example, a remote application program 185 is stored in the memory device 181 in FIG. 1, though the program module stored in the memory device 181 is not limited to it. The network connections in FIG. 1 are illustrative, and another unit is available to establish a communication link between computers.

<HDR Image Generation Method>

Processing of compositing a plurality of images having different exposure times using the computing system environment 100 shown in FIG. 1, thereby generating one HDR image wider in dynamic range than these images will be explained. The processor 120 is the main processor of each processing to be described below, unless otherwise specified. Roughly speaking, in the embodiment, even when a series of bracketed images capture scenes and camera motions, an HDR image is generated using these images.

In the embodiment, a plurality of images having different exposure times are acquired first when generating an HDR image. These images can be captured using bracketing. Bracketing is a term originally used in photography, and means taking a plurality of pictures of the same scene at a plurality of exposure settings in expectation of obtaining one picture at the correct exposure level.

In the following description, a set of images captured by the camera 192 while changing the exposure level are sometimes called "bracketed images". In other words, a series of images 193 are bracketed images.

One method for achieving bracketing uses an autobracketing function installed in many current still cameras. When automatically bracketing a given scene, the camera 192 determines the correct exposure using the current photometry mode and captures an image at this level. Then, the camera 192 additionally captures images at many exposures obtained by multiplying the original exposure by a fixed factor. For example, most cameras like the camera 192 capture one image in an exposure time (for example, an aperture value of +1 to 2) shorter than that of an image at the "correct exposure", and capture one image in a longer exposure time (for example, an aperture value of −1 to 2). Note that the number of images in the bracketing sequence and changes in exposure time between these images are ideally set so that these images capture at once almost all luminance changes in a scene represented in them. In this case, a resultant HDR image exhibits the entire dynamic range of the scene.

Figure 2:
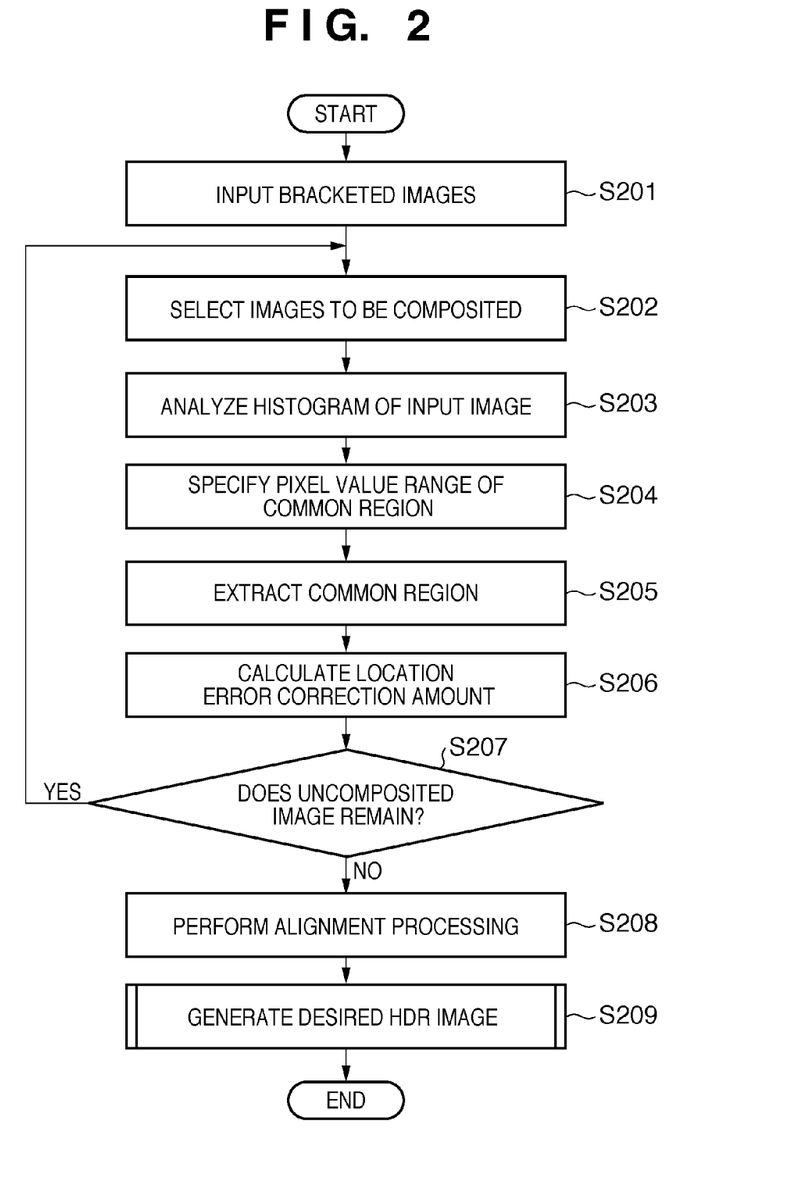
FIG. 2 is a flowchart showing processing of generating one HDR image.

FIG. 2 is a flowchart showing processing of generating one HDR image by compositing a plurality of images having different exposure times. A program and data (including data explained as known one in the following description) for causing the processor 120 to execute the processing according to the flowchart shown in FIG. 2 are stored in the RAM 132 and processed by the processor 120.

The computer 110 receives, from the camera 192 or the like via the camera interface 194, a plurality of images (bracketed images) captured in different exposure times. In step S201, the processor 120 temporarily stores (acquires) these image data in the RAM 132. When temporarily storing a plurality of images captured in different exposure times in the RAM 132 regardless of the method of obtaining bracketed images, the processor 120 rearranges these images in order of exposure time.

Figure 3A:
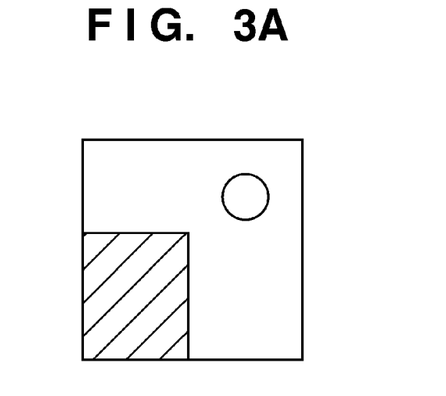
FIG. 3A is a view exemplifying an object.
Figure 3B:
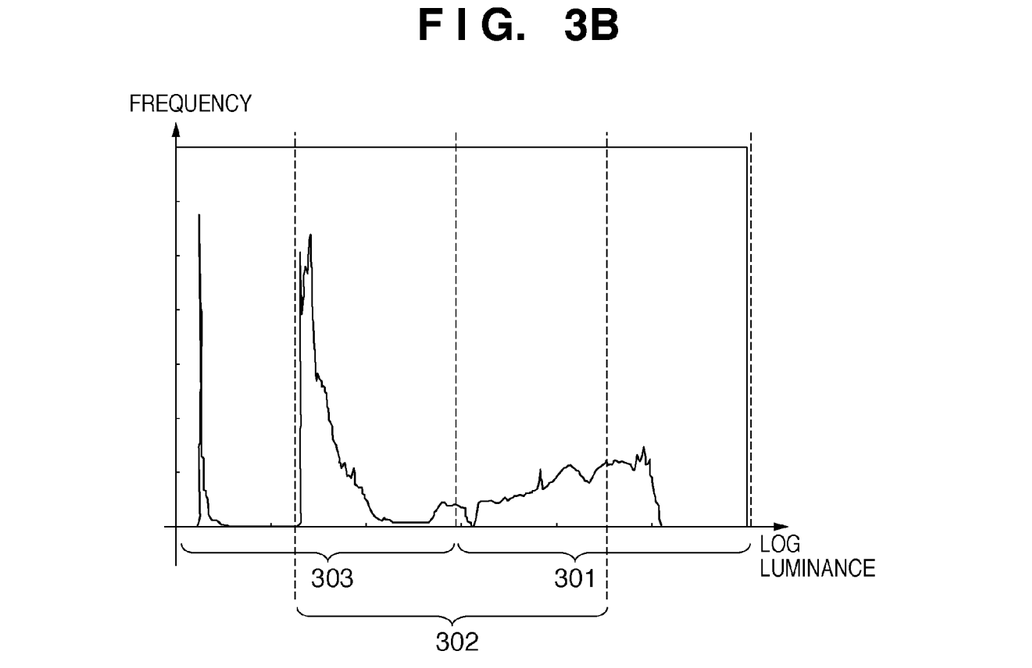
FIG. 3B is a histogram showing a pixel value range capturable in accordance with the original luminance distribution and exposure time of the object.

FIG. 3A is a view exemplifying an object to be captured in the embodiment. FIG. 3B is a graph showing a pixel value range capturable in accordance with the original luminance distribution and exposure time of the object. When an image is captured in a relatively short exposure time, pixel values within a pixel value range 301 in FIG. 3B can be obtained. That is, the pixel values of pixels which form an image captured in this case fall within the pixel value range 301. When an image is captured in a relatively long exposure time, pixel values within a pixel value range 303 in FIG. 3B can be obtained. That is, the pixel values of pixels which form an image captured in this case fall within the pixel value range 303. When an image is captured in an intermediate exposure time, pixel values within a pixel value range 302 in FIG. 3B can be obtained. That is, the pixel values of pixels which form an image captured in this case fall within the pixel value range 302.

Referring back to FIG. 2, in step S202, the processor 120 sets pairs (image pairs) each of two adjacent images among a plurality of images rearranged in the RAM 132. More specifically, a plurality of images are aligned in order of exposure time, and pairs (image pairs) each of two images adjacent on the line are set. Processing of setting image pairs among images temporarily stored in the RAM 132 in step S201 will be explained with reference to FIGS. 4A and 4B.

Figure 4A:
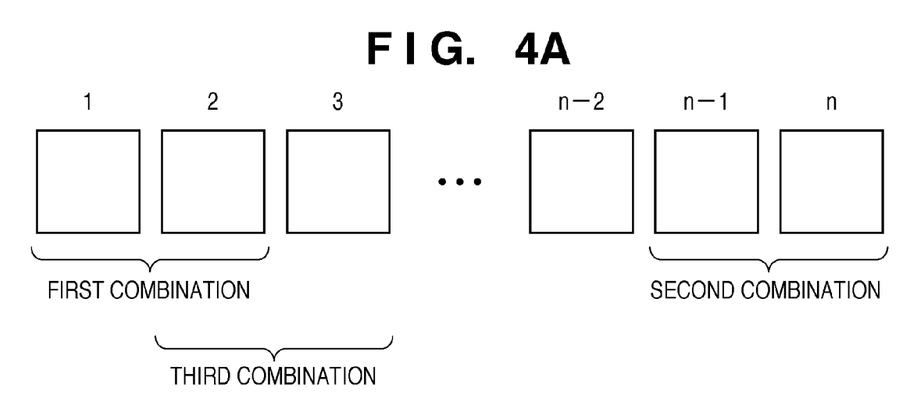
FIG. 4A is a view for explaining processing of setting image pairs among a plurality of images captured in different exposure times.

FIG. 4A is a view for explaining processing of setting image pairs among a plurality of images captured in different exposure times. FIG. 4A shows n images aligned in order of exposure time. The exposure time is longer for an image toward the right on the sheet surface and shorter for an image toward the left.

Figure 4B:
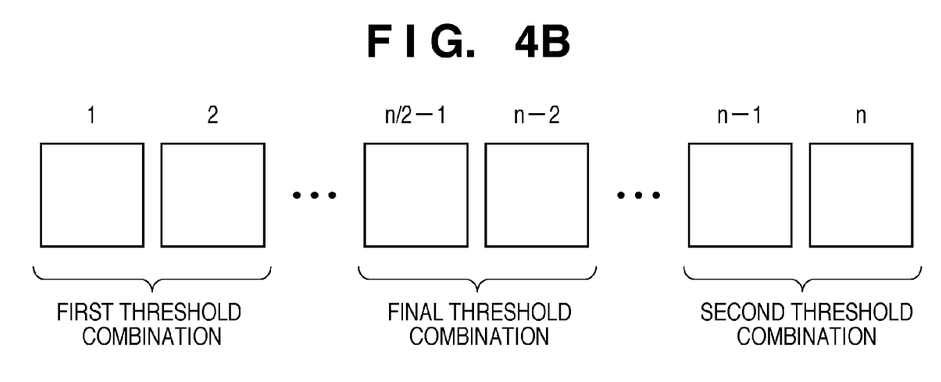
FIG. 4B is a view for explaining processing of selecting one image pair.

In step S202, the processor 120 counts the number of images temporarily stored in the RAM 132 in step S201. In FIGS. 4A and 4B, the counting result is n. The processor 120 sets one image pair of an image having a shortest exposure time and one having a second shortest exposure time. The set image pair is the "first combination (pair)". Then, the processor 120 sets one image pair of an image having a longest exposure time and one having a second longest exposure time. The set image pair is the "second combination (pair)". The processor 120 sets one image pair of an image having a second shortest exposure time and one having a third shortest exposure time. The set image pair is the "third combination (pair)". In this manner, the processor 120 selects combinations in order from images having longer exposure times and those having shorter exposure times.

Upon completion of setting image pairs, in step S202, the processor 120 selects one image pair as a selected image pair (pair of interest) from the set image pairs. The processor 120 obtains the location error correction amount between the two images of the selected image pair. FIG. 4B is a view for explaining processing of selecting one image pair. The selection order is the same as the image pair setting order. In the following description, IM0 is an image (short-time image) having a shorter exposure time and IM1 is an image (long-time image) having a longer exposure time out of two images of the selected image pair.

Figure 5A:
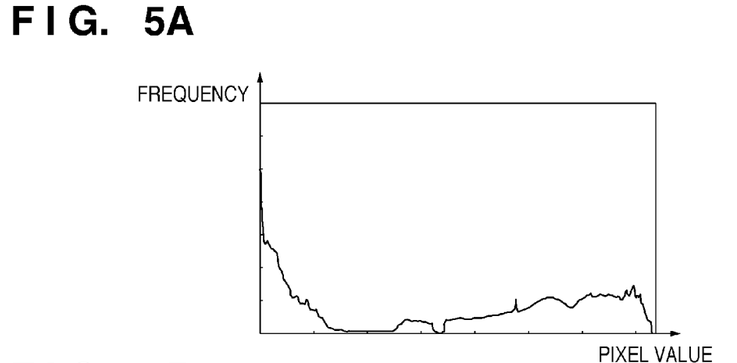
FIG. 5A is a histogram.

Referring back to FIG. 2, in step S203, the processor 120 creates the histogram of pixel values contained in IM0, and that of pixel values contained in IM1. When IM0 is an image having a shortest exposure time, its histogram generally exhibits a reverse sigmoidal hill and a low hill in the high pixel value range, as shown in FIG. 5A, and many pixels tend to gather at low pixel values. FIG. 5A is a histogram showing the general pixel value histogram of an image having a shortest exposure time. In FIG. 5A, the abscissa axis indicates the pixel value, and the ordinate axis indicates the occurrence frequency of the pixel value.

Figure 5B:
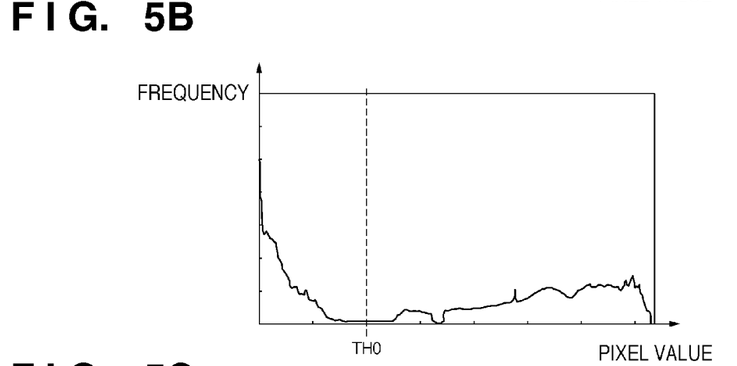
FIG. 5B is a histogram showing the threshold TH0 for the histogram.

In IM0, most pixels valid in processing of obtaining the location error correction amount of IM1 gather in a pixel range of high pixel values. Thus, it is desired that a threshold TH0 is set between the lower limit of the reverse sigmoidal shape and the hill, as shown in FIG. 5B. FIG. 5B is a histogram showing the threshold TH0 for the histogram shown in FIG. 5A. The threshold TH0 can be obtained using the Otsu's method or the like. However, the method of attaining the threshold TH0 is not limited to this, and various methods are conceivable. In step S203, therefore, the processor 120 obtains the threshold TH0, and calculates the sum S1 of the occurrence frequencies of pixel values from the maximum pixel value (for example, 255 when the pixel value of IM0 is given by 8 bits) to a pixel value corresponding to the threshold TH0.

Figure 5C:
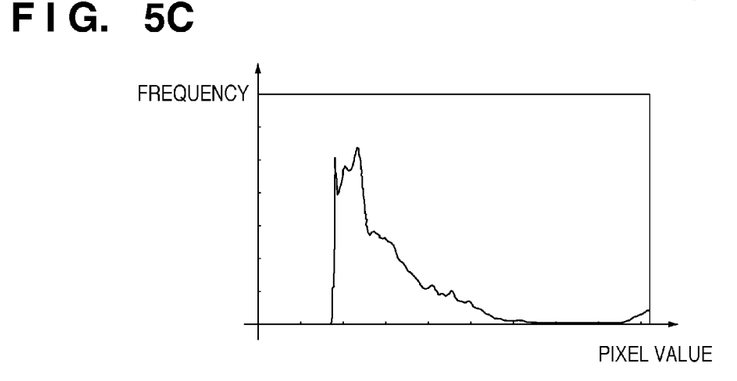
FIG. 5C is a histogram.

In step S203, the processor 120 also obtains a threshold TH1 for IM1. IM1 is an image having an intermediate exposure time, and its histogram is generally one as shown in FIG. 5C almost free from highlight- and shadow-detail losses. FIG. 5C is a histogram showing the general pixel value histogram of an image having an intermediate exposure time. In FIG. 5C, the abscissa axis indicates the pixel value, and the ordinate axis indicates the occurrence frequency of the pixel value.

Figure 6A:
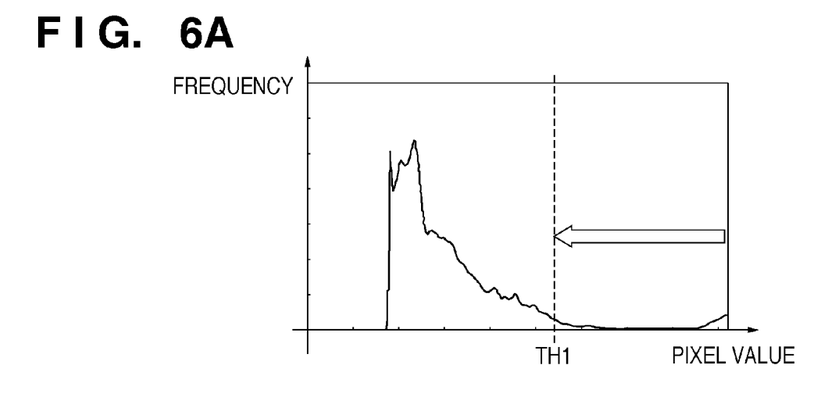
FIG. 6A is a histogram for explaining a method of setting the threshold TH1.

In step S203, the processor 120 moves a threshold $\alpha$ from the maximum pixel value (for example, 255 when the pixel value of IM1 is given by 8 bits) in a direction in which the pixel value decreases, as shown in FIG. 6A. The processor 120 calculates the sum S2 of the occurrence frequencies of pixel values from the maximum pixel value to the threshold $\alpha$ every time the threshold $\alpha$ moves by 1. The threshold $\alpha$ at which the sum S2 becomes closest to the sum S1 is set as the final threshold TH1 ($=\alpha$). Needless to say, the method of obtaining the threshold TH1 is not limited to this, and the threshold TH1 may be obtained using another method as long as the threshold TH1 has a similar characteristic. The above-described method of obtaining the threshold TH0 first and then the threshold TH1 will be called "method 1".

Figure 6B:
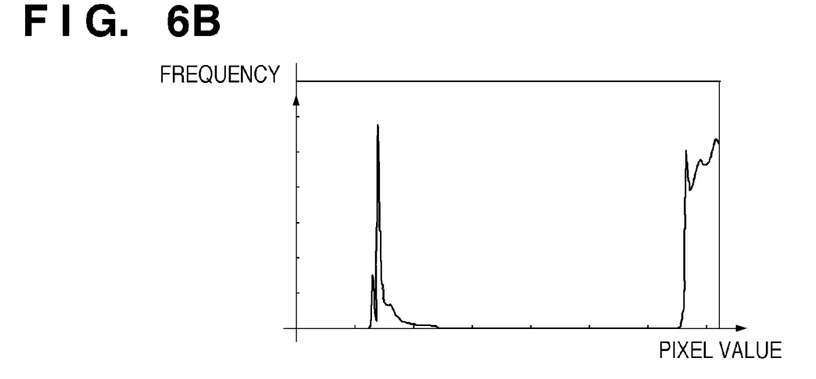
FIG. 6B is a histogram.

When IM1 is an image having a longest exposure time, its histogram exhibits a sigmoidal hill and a low hill in the low pixel value range, as shown in FIG. 6B, and many pixels tend to be gathered at high pixel values. Thus, when IM1 is an image having a longest exposure time and IM0 is an image having a second longest exposure time, it is desirable to obtain the threshold TH1 first and then the threshold TH0, unlike the foregoing method of setting the threshold TH0 first and then the threshold TH1.

Figure 6C:
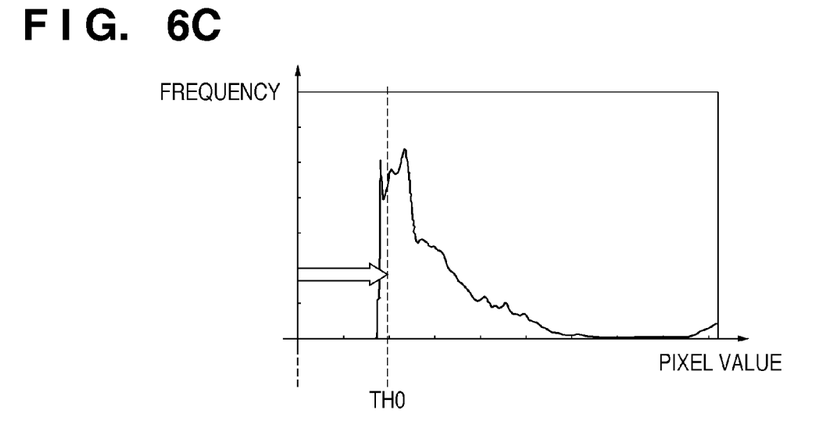
FIG. 6C is a histogram for explaining a method of setting the threshold TH0.

At this time, the processor 120 obtains the threshold TH1 using the Otsu's method or the like to be set between the lower limit of the sigmoidal shape and the hill. Further, the processor 120 calculates the sum S3 of the occurrence frequencies of pixel values from the minimum pixel value ($=0$) to a pixel value corresponding to the threshold TH1. For the threshold TH0, the processor 120 moves the threshold $\alpha$ from the minimum pixel value ($=0$) in a direction in which the pixel value increases, as shown in FIG. 6C. The processor 120 calculates the sum S4 of the occurrence frequencies of pixel values from the minimum pixel value to the threshold $\alpha$ every time the threshold $\alpha$ moves by 1. The threshold $\alpha$ at which the sum S4 becomes closest to the sum S3 is set as the final threshold TH0 ($=\alpha$). As a matter of course, the method of obtaining the threshold TH0 is not limited to this, and the threshold TH0 may be obtained using another method as long as the threshold TH0 has a similar characteristic. This method of obtaining the threshold TH1 first and then the threshold TH0 will be called "method 2".

Note that a threshold setting method for image pairs other than one containing an image having a longest exposure time and one containing an image having a shortest exposure time is as follows. More specifically, method 2 is applied to image pairs each containing an "image having an intermediate exposure time (or close time) between the longest and shortest exposure times" and an image having an exposure time up to the longest one. In contrast, method 1 is applied to image pairs each containing an image having an intermediate exposure time (or close time) and an image having an exposure time up to the shortest one.

A region (common region) used as a reference for obtaining a location error correction amount is specified in both IM0 and IM1 using the thresholds TH0 and TH1. In step S204, the processor 120 sets a pixel value range for specifying the region.

Figure 7A:
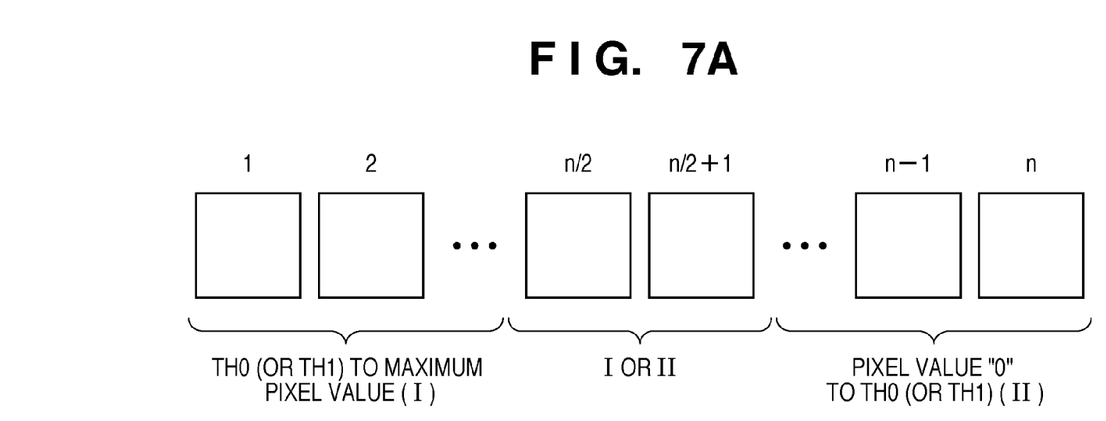
FIGS. 7A and 7B are views for explaining processing of setting a pixel value range for specifying a common region.
Figure 7B:
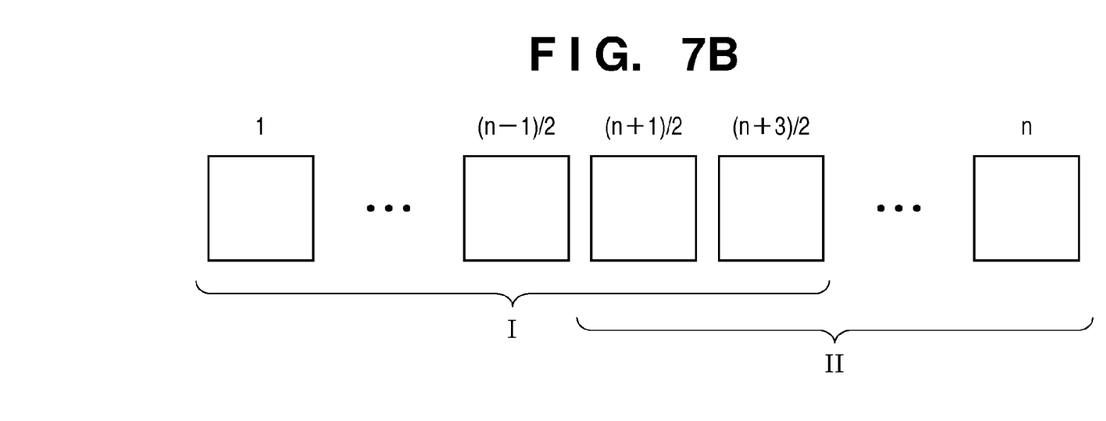

The processing in step S204 changes depending on whether the number of images (counted in step S202) temporarily stored in the RAM 132 in step S201 is even or odd. FIGS. 7A and 7B are views for explaining processing of setting a pixel value range for specifying a common region. FIG. 7A shows processing of setting a pixel value range for specifying a common region when the number of images is even. FIG. 7B shows processing of setting a pixel value range for specifying a common region when the number of images is odd. FIGS. 7A and 7B show n images aligned in order of exposure time, as shown in FIGS. 4A and 4B. In FIGS. 7A and 7B, the exposure time is longer for an image toward the right and shorter for an image toward the left on the sheet surface. In this description, images will be referred to as image 1, image 2, . . . sequentially from an image having a shortest exposure time to one having a longest exposure time.

When the number of images is even, pixel value ranges are set for IM0 and IM1, as shown in FIG. 7A. More specifically, for image pairs each containing two of image 1 to image (n/2−1), the pixel value range of the threshold TH0 to the maximum pixel value is set for the images IM0, and the pixel value range of the threshold TH1 to the maximum pixel value is set for the images IM1. For example, the pixel value range of a pixel value corresponding to the threshold TH0 to the maximum pixel value is set for image 1 (IM0), and the pixel value range of a pixel value corresponding to the threshold TH1 to the maximum pixel value is set for image 2 (IM1).

For image pairs each containing two of image (n/2+2) to image n, the pixel value range of the minimum pixel value to the threshold TH0 is set for the images IM0, and the pixel value range of the minimum pixel value to the threshold TH1 is set for the images IM1. For example, the pixel value range of the minimum pixel value to a pixel value corresponding to the threshold TH0 is set for image (n−1) (IM0), and the pixel value range of the minimum pixel value to a pixel value corresponding to the threshold TH1 is set for image n (IM1).

As the pixel value range set for images (n/2) and (n/2+1), a pixel value range containing a larger number of pixels is selected from the above-described pixel value ranges.

To the contrary, when the number of images is odd, pixel value ranges are set for IM0 and IM1, as shown in FIG. 7B. More specifically, for image pairs each containing two of image 1 to image (n+1)/2, the pixel value range of the threshold TH0 to the maximum pixel value is set for the images IM0, and the pixel value range of the threshold TH1 to the maximum pixel value is set for the images IM1. For image pairs each containing two of image (n+1)/2 to image n, the pixel value range of the minimum pixel value to the threshold TH0 is set for the images IM0, and the pixel value range of the minimum pixel value to the threshold TH1 is set for the images IM1.

Figure 8A:
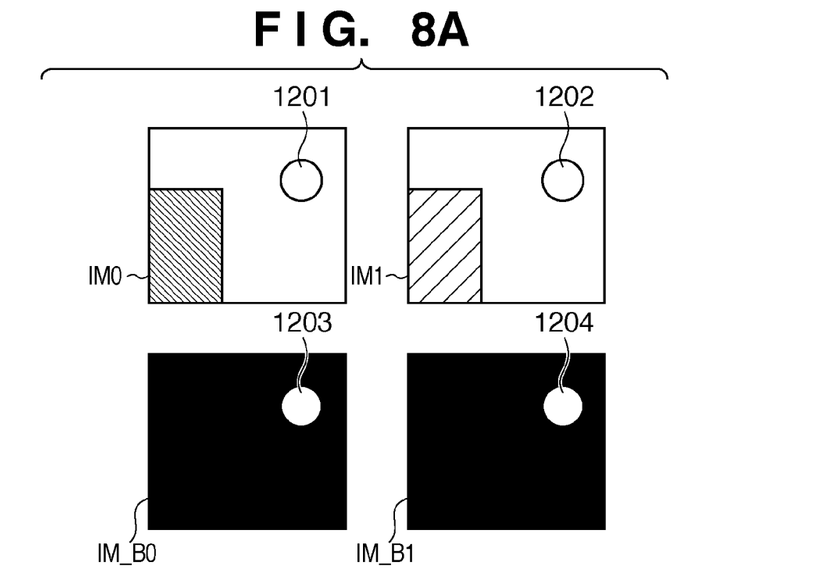
FIG. 8A is a view for explaining processing of generating IM_B0 and IM_B1.

By this processing, pixel value ranges are set for IM0 and IM1. In step S204, the processor 120 specifies, in IM0, a region (common region 0) within the pixel value range set for IM0 (first specification). The processor 120 generates a binary image IM_B0 in which pixel values in the specified region are replaced with 1 and those in the remaining region are replaced with 0. Similarly, the processor 120 specifies, in IM1, a region (common region 1) within the pixel value range set for IM1 (second specification). The processor 120 generates a binary image IM_B1 in which pixel values in the specified region are replaced with 1 and those in the remaining region are replaced with 0. FIG. 8A is a view for explaining processing of generating IM_B0 and IM_B1.

In FIG. 8A, a region 1201 (common region 0) is formed from pixels having pixel values within the pixel value range set for IM0. A region 1202 (common region 1) is formed from pixels having pixel values within the pixel value range set for IM1. In the binary image IM_B0, pixel values in the region 1201 of IM0 are replaced with 1, and those in the remaining region are replaced with 0. A region 1203 is made up of pixels having the pixel value "1", and corresponds in location to the region 1201. Similarly, in the binary image IM_B1, pixel values in the region 1202 of IM1 are replaced with 1, and those in the remaining region are replaced with 0. A region 1204 is made up of pixels having the pixel value "1", and corresponds in location to the region 1202.

Referring back to FIG. 2, in step S205, the processor 120 generates a binary composite image by compositing IM_B0 and IM_B1, that is, by ANDing IM_B0 and IM_B1 for each pixel. A region made up of pixels having the pixel value "1" in the generated binary composite image is a common portion (overlapping portion) between common regions 0 and 1. In step S205, the processor 120 determines whether the size (number of pixels which form the common portion) of the common portion is equal to or larger than a predetermined value. If the size of the common portion is equal to or larger than the predetermined value, common regions 0 and 1 are set in regions IM_O0 and IM_O1 used in the processing of obtaining a location error correction amount.

Figure 8B:
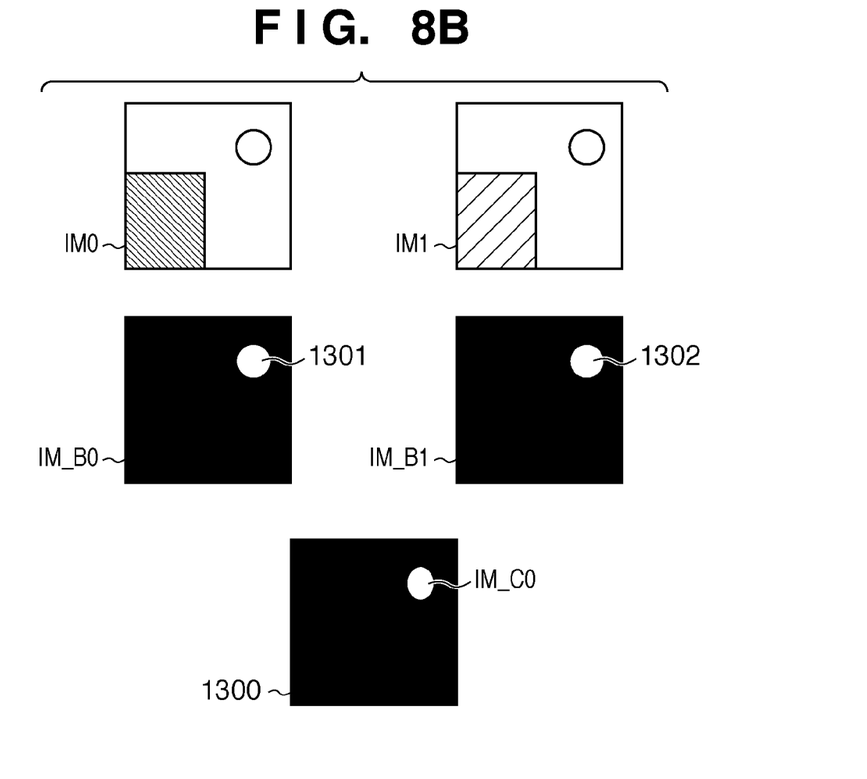
FIG. 8B is a view for explaining processing in step S205.

FIG. 8B is a view for explaining the processing in step S205. In FIG. 8B, reference numeral 1300 denotes a binary composite image of IM_B0 and IM_B1; 1301, a common region in IM_B0; and 1302, a common region in IM_B1. IM_C0 is a portion common between the common regions 1301 and 1302 in the binary composite image 1300. If the size (number of pixels) of IM_C0 is equal to or larger than a predetermined value, the common region 1301 is set in IM_O0, and the common region 1302 is set in IM_O1.

In step S206, the processor 120 obtains the location error correction amount between IM0 and IM1. This is equivalent to processing of obtaining a correction amount by which the location error of IM1 from IM0 is corrected to make IM0 and IM1 match each other and precisely composite images. A method of obtaining the location error correction amount will be explained.

First, location error correction accompanying translation, rotation, and enlargement/reduction is performed for the entire IM1 so that IM_O1 and IM_O1 substantially match each other when IM1 having undergone location error correction is composited with IM0. This correction can be easily achieved using affine transformation capable of translation, rotation, and scaling. A transformation method based on affine transformation is defined by $$\begin{bmatrix} x' \\ y' \end{bmatrix} = \begin{bmatrix} a & b \\ c & d \end{bmatrix} \begin{bmatrix} x \\ y \end{bmatrix} + \begin{bmatrix} e \\ f \end{bmatrix}$$

When the location error of IM1 from IM0 is corrected using IM0 as a reference, that is, when IM1 undergoes the affine transformation, (x',y') is the coordinate position of IM_O0 in IM0, and (x,y) is that of IM_O1 in IM1. (a, b, c, d, e, f) are affine transformation parameters indicating translation, rotation, scaling, and the like. These parameters are set to satisfy the above equation.

When the translation amount differs between IM0 and IM1 depending on the pixel position, location correction by only the affine transformation is sometimes insufficient. For example, a small difference in object posture that appears as an error of several pixels in the image cannot be satisfactorily corrected by overall location correction. For this reason, precise location correction is executed next to correct a small location error for each pixel. In the precise location correction, only the translation amount between pixels is corrected. Precise location correction using a block matching method will be explained.

Figure 9A:
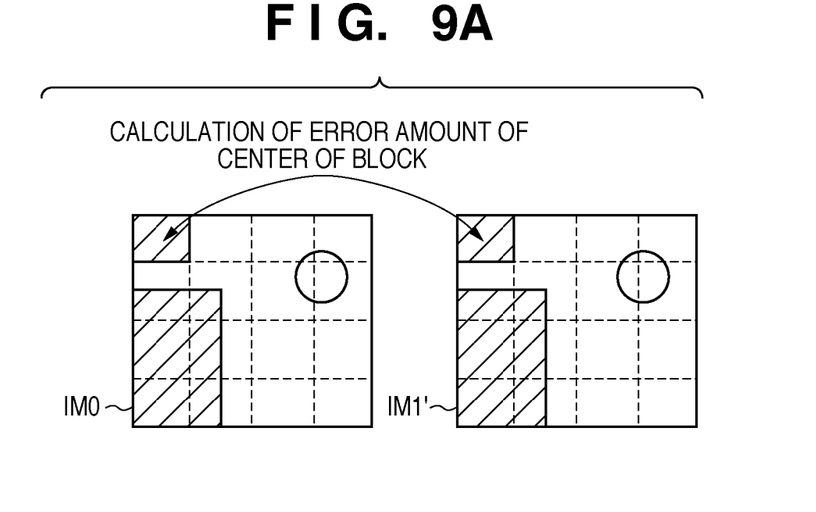
FIG. 9A is a view showing the blocks of IM0 and IM1'.

First, IM1 undergoes affine transformation based on the foregoing equation using the parameters obtained by the processing above, thereby generating IM1'. Then, IM0 and IM1' are divided into blocks, as shown in FIG. 9A. FIG. 9A is a view showing the blocks of IM0 and IM1'. The degree of correlation is obtained between blocks at corresponding locations in IM0 and IM1', attaining the error amount of the center of the block. After performing this processing for all block pairs, the error amount of each pixel is calculated. It suffices to estimate the error amount of each pixel by interpolation such as linear interpolation from the error amount of a pixel corresponding to the center of the block. The calculation expressions of the block matching method are well known and described in, for example, the following reference:

E. De Castro and C. Morandi "Registration of Translated and Rotated Images Using Finite Fourier Transforms", IEEE Transactions on pattern analysis and machine intelligence, September 1987

By calculating the error amount of each pixel, IM1 having undergone the affine transformation can be further corrected for each pixel. In step S206, the processor 120 obtains, as a location error correction amount, a set of the affine transformation parameters and the error amount of each pixel.

In step S207, the processor 120 determines whether there is an image pair for which no location error correction amount has been calculated. If YES in step S207, the process returns to step S202 to perform the subsequent processing for an image pair for which no location error correction amount has been calculated. If NO in step S207, the process advances to step S208.

When the process advances to step S208, the location error correction amounts of all image pairs have already been calculated. In step S208, therefore, the processor 120 performs processing (image processing) for IM1 of each image pair using the location error correction amount obtained in step S206. That is, IM1 undergoes affine transformation (rotation and translation) using the affine transformation parameters, and then the error of each pixel is corrected using the error amount of each pixel. Image composition does not use a portion unnecessary for compositing processing as a result of rotation, that is, the end of the image. Accordingly, IM_O0 and IM_O1 substantially match each other when IM0 and IM1 are composited.

Finally, in step S209, the processor 120 generates an HDR image by compositing the images having undergone location error correction in step S208. In the embodiment, when compositing images, less exposed images are multiplied by a composition gain and sequentially composited with more exposed images. There are various HDR image generation methods and the method is not particularly limited. For example, a technique disclosed in Japanese Patent Laid-Open No. 2002-290829 may be employed.

The generated HDR image may be output to the storage device such as the RAM 132 or hard disk drive 141, displayed on the monitor 191, or externally output via the network.

As described above, according to the first embodiment, common regions serving as an alignment reference can be extracted from a plurality of images having different exposure times. By using the common regions, the images can be aligned at high precision. From these images, a higher-quality HDR image can be generated.

Second Embodiment

Figure 9B:
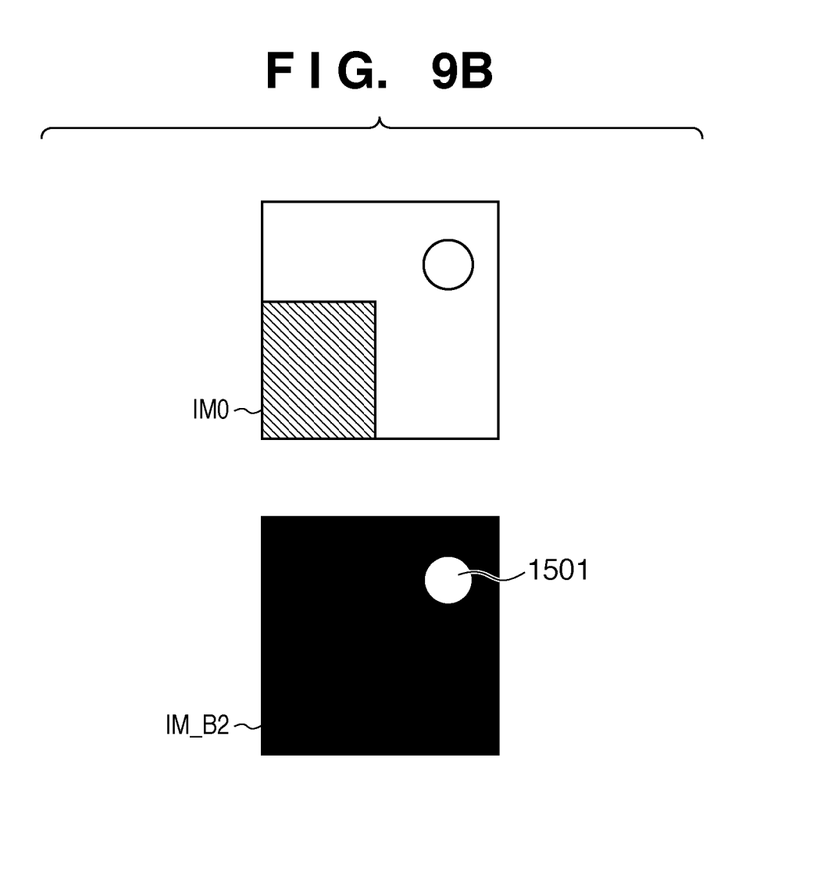
FIG. 9B is a view for explaining a binary image IM_B2 for IM0.

Only a difference from the first embodiment will be described below. The second embodiment is different from the first embodiment in processing of specifying a common region. In the second embodiment, when specifying a common region 0 in IM0, IM0 undergoes γ conversion to convert the luminance of IM0. The common region 0 is obtained from the γ-converted IM0 by the same processing as that in the first embodiment. FIG. 9B is a view for explaining a binary image IM_B2 for IM0. The common region 0 is specified in the γ-converted IM0. The pixel values of pixels that form the common region 0 specified in the γ-converted IM0 are replaced with 1, and those of pixels in the remaining region are replaced with 0, thereby generating the binary image IM_B2. Reference numeral 1501 denotes a common region 0 in the binary image IM_B2.

In the first and second embodiments, the computer executes the respective processes. However, if the camera has a satisfactory processing capability (processing speed and data capacity), it may execute the respective processes described in the first and second embodiments.

In the first and second embodiments, only one common region exists in an image for descriptive convenience. However, a plurality of regions can exist, each of which is formed from pixels having pixel values within a set pixel value range.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-147950 filed Jun. 22, 2009 which is hereby incorporated by reference herein in its entirety.

What is claimed is:

1. An image processing apparatus comprising:
a setting unit that sets two images;
a specification unit that specifies common regions in (i) a long-time image, which is an image having a longer exposure time out of the two images, and (ii) a short-time image, which is an image having a shorter exposure time out of the two images, based on pixel values within a first pixel value range in a pixel value distribution of the long-time image and pixel values within a second pixel value range in a pixel value distribution of the short-time image;
a calculation unit that calculates a location error correction amount between the long-time image and the short-time image to make the common region in the long-time image match the common region in the short-time image when the long-time image and the short-time image are overlapped with each other; and
a unit that generates a composite image by compositing the long-time image and short-time image based on the location error correction amount, and outputs the generated composite image,
wherein the specification unit includes (a) a first specification unit which specifies, in the long-time image, a region having a pixel value within the first pixel value range determined in accordance with a threshold set based on the pixel value distribution of the long-time image, and (b) a second specification unit which specifies, in the short-time image, a region having a pixel value within the second pixel value range determined in accordance with a threshold set based on the pixel value distribution of the short-time image, and
wherein, when the region specified by the first specification unit and the region specified by the second specification unit have an overlapping portion not smaller than a predetermined size, upon compositing the long-time image and the short-time image, the region specified by the first specification unit and the region specified by the second specification unit are set as the common regions.

2. The apparatus according to claim 1, wherein the calculation unit includes: (a) a unit which obtains an affine transformation parameter to make the common region in an image obtained by performing affine transformation for the long-time image match the common region in the short-time image; and (b) a unit which obtains a location error amount of each pixel to make the image obtained by performing affine transformation for the long-time image match the short-time image, and
wherein the calculation unit calculates the affine transformation parameter and the location error amount of each pixel as the location error correction amount.

3. The apparatus according to claim 1, wherein the composite image is an image wider in dynamic range than the image.

4. An image processing method using a computer to perform steps comprising:
a setting step that sets two images;
a specification step, by a computer, of specifying common regions in (i) a long-time image, which is an image having a longer exposure time out of the two images and (ii) a short-time image, which is an image having a shorter exposure time out of the two images, based on pixel values within a first pixel value range in a pixel value distribution of the long-time image and pixel values within a second pixel value range in a pixel value distribution of the long-time image and pixel values within a second pixel value range in a pixel value distribution the short-time image;
a calculation step of calculating a location error correction amount between the long-time image and the short-time image to make the common region in the long-time image match the common region in the short-time image when the long-time image and the short-time image are overlapped with each other; and
a step of generating a composite image by compositing the long-time image and short-time image based on the location error correction amount, thereby outputting the generated composite image,
wherein the specification step includes (a) a first specification step of specifying, in the long-time image, a region having a pixel value within the first pixel value range determined in accordance with a threshold set based on the pixel value distribution of the long-time image, and (b) a second specification step of specifying, in the short-time image, a region having a pixel value within the second pixel value range determined in accordance with a threshold set based on the pixel value distribution of the short-time image, and
wherein, when the region specified by the first specification step and the region specified by the second specification step have an overlapping portion not smaller than a predetermined size, upon compositing the long-time image and the short-time image, the region specified by the first specification step and the region specified by the second specification step are set as the common regions.

5. A non-transitory computer-readable storage medium storing a computer program for causing a computer to function as each unit of an image processing apparatus defined in claim 1.

6. The apparatus according to claim 1, further comprising a unit that acquires a plurality of images captured in different exposure times,
wherein said setting unit sets the two images among the plurality of images.

7. The apparatus according to claim 6, wherein when the plurality of images are aligned in order of exposure time, said setting unit sets pairs each of two images adjacent on a line.

* * * * *